Patented July 23, 1940

2,209,184

UNITED STATES PATENT OFFICE 2,209,184

PARASITICIDE DERIVED FROM TERPENES

Joseph N. Borglin, Wilmington, Del., assignor to Hercules Powder Company, Wilmington, Del., a corporation of Delaware No Drawing. Application May 13, 1938, Serial No. 207,780

9 Claims. (Cl. 167—30)

This invention relates to a parasiticide and more particularly to a parasiticide composition comprising a terpene compound having the type formula ROOCR'XCN in which R is a terpene radical, R' is an aliphatic or aromatic nucleus and X is sulfur, selenium or tellurium.

I have found that these compounds are exceedingly effective parasiticides either when used alone or diluted with other toxic materials or with carriers. Furthermore, I have found that, strangely enough, they are definitely more effective parasiticides than the alkyl thiocyanates heretofore used for this purpose. These various thio-, seleno-, and telluro-cyanate derivatives of the terpenes are particularly useful as insecticides and especially as contact insecticides against soft-bodied insects such as aphids, flies, roaches, bed bugs, fleas, etc., and are useful in the control of fungi or other micro-organisms.

The composition in accordance with this invention will include a compound of the type formula, ROOCR'XCN, in which R is a terpene radical, R' is an aliphatic or aromatic radical and X is an element of the group consisting of sulfur, selenium and tellurium. Hereinafter, I shall refer to these compounds as terpene thiocyanoacylates, terpene selenocyanoacylates, and terpene tellurocyanoacylates, respectively.

The terpene radical R of the ROOCR'XCN compound hereinbefore mentioned may be derived from an unsaturated terpene hydrocarbon, a terpene alcohol, a terpene ether, a terpene ester, etc. The ROOCR'XCN compound may be, for example, the thiocyanoacylate, selenocyanoacylate, or tellurocyanoacylate derivative of pinene, dipentene, carene, camphene, menthene, fenchene, terpinene, terpinolene, limonene, terpineol, hydroterpineol, polymerized terpenes, sesquiterpenes, allo-occimene, etc., or the corresponding derivatives of commercial terpene mixtures, such as, for example, turpentine, pine oil, etc. Similarly, the compound may be, for example, the derivative of a terpene ether, such as terpinyl methyl ether, terpinyl ethyl ether, terpinyl glycol ether, terpinyl glycerol ether, anethol, methyl chavicol, etc.; a terpene ester, such as terpinyl acetate, propionate, etc., hydroterpineol acetate, propionate, etc.; or a synthetic terpene alcohol, such as a terpene chlorhydrin, the condensation product of pinene, dipentene, etc., with formaldehyde.

The composition will also contain a diluent which may be another toxic material, an admixture of other toxic materials, an inert carrier material or an admixture of another toxic material and an inert carrier.

The inert carrier selected for use in the compositions according to this invention may be varied depending upon the method of application by which, and the purpose for which, the composition will be ultimately used. This composition can be used as a solution or an emulsion suitable for application as a spray, or as a dusting powder, or as a paint, or gum. The carrier used in a composition intended for application as a spray will be a liquid of the type commonly used as a carrier liquid in parasiticide compositions, such as, for example, water, petroleum hydrocarbons, etc., as ordinary or deodorized kerosene, mineral oils, as, white oil, etc. The carrier used in compositions intended for application as a dust will be a finely divided solid of the type commonly used as a carrier for insecticidal dusts such as, for example, talc, colloidal clays, bentonite, fuller's earth, sulfur, etc.

Compositions for application as a spray may be utilized in the form of a solution or suspension. Such compositions will comprise a terpene thiocyanoacylate, a selenocyanoacylate or a tellurocyanoacylate or an admixture of these materials dissolved in a carrier liquid which is a solvent therefor, such as, for example, deodorized or ordinary kerosene, mineral oils, as, white oil, etc. Such compositions are suitable for use in the control of insects, such as flies, mosquitoes, roaches, bed bugs, fleas, silver fish, etc.

A typical composition of this type for spray application will consist of a terpene thiocyanoacylate, a selenocyanoacylate, or a tellurocyanoacylate in deodorized kerosene, the terpene derivative being in an amount within the range of about 1.0% to about 10.0% by weight of the composition. Concentrates for dilution to produce compositions of this type will carry higher concentrations of the terpene derivative.

Compositions for application as a spray may also be utilized in the form of an aqueous emulsion. Such compositions will comprise a terpene thiocyanoacylate, selenocyanoacylate, or tellurocyanoacylate which may be either emulsified directly in water, or dissolved in a limited amount of a water-immiscible solvent and the solution thus formed emulsified in water. Such emulsions will desirably contain emulsifying agents such as, for example, the alkali metal salts of sulfated abietyl or hydroabietyl alcohol, sulfonated pinenephenol condensate, alkali metal resinates, as sodium resinate, etc., the alkali metal soaps, as, sodium oleate, sodium stearate, etc. They may be prepared in completely finished form at the point of manufacture or they may be prepared in the form of a concentrate comprising the terpene derivative and an emulsifying agent, and then diluted and emulsified with water at the point of application, thus, avoiding the unnecessary packaging, transportation and handling of water. Emulsified compositions of this type are advantageous for the destruction of insects attacking horticultural plants such as, for example, the various kinds of plant lice, thrips, aphids, harlequin cabbage bugs, canker worms, Japanese beetles, Mexican bean beetles, etc.

The insecticidal compositions in accordance with this invention may also be used, in the form of insecticidal dust, for the destruction of insects which attack agricultural or horticultural plants. The terpene thiocyanoacylate, selenocyanoacylate, or tellurocyanoacylates, either alone or admixed with other toxic insecticidal materials, will be thoroughly admixed with a powdered solid material of the type commonly used for insecticidal dusts to produce such an insecticidal dust.

A typical composition of this type is, for example, talc, of about 200 mesh, incorporated with from about 1% to about 10% by weight of one or more of the hereinabove mentioned terpene cyanoacylates. Concentrates for dilution to produce compositions of this type will carry higher concentrations of the terpene derivative.

The terpene thiocyanoacylate which I utilize may be prepared by reacting a terpene compound which contains a hydroxyl group or which is unsaturated, with a halogen substituted organic acid, and then reacting this product with a reactive metal thiocyanate, such as, for example, an alkali metal thiocyanate, by the process disclosed and claimed in the copending application of Joseph N. Borglin, Serial No. 198,687, filed March 29, 1938. The terpene selenocyanoacylates and the terpene tellurocyanoacylates can also be prepared by this process by substituting a reactive metal selenocyanate or a reactive metal tellurocyanate, respectively, for the metal thiocyanate.

The compositions in accordance with this invention are further illustrated by the formulae for compositions suitable for application as a spray, given in Table 1 which follows:

Table 1

| | I | II | III | IV | V |
|---|---|---|---|---|---|
| | Percent | Percent | Percent | Percent | Percent |
| Fenchyl thiocyano acetate | 5.0 | 5.0 | 5.0 | | |
| Fenchyl thiocyano propionate | | | | 2.5 | 2.5 |
| Pine oil | | | 5.0 | | |
| Glycol ether of pinene | | 2.5 | | | |
| Pyrethrins (I and II) | | | | 0.5 | |
| Rotenone | | | | | 0.1 |
| Kerosene | 95.0 | 92.5 | 90.0 | 97.0 | 97.4 |

Examples of insecticidal powder in accordance with this invention are shown in Table 2 which follows:

Table 2

| | VI | VII | VIII | IX |
|---|---|---|---|---|
| | Percent | Percent | Percent | Percent |
| Terpene thiocyanoacylate | 2.5 | 5 | 5 | 2.5 |
| Pyrethrins (I and II) | | | | 0.3 |
| Rotenone | 0.25 | | | |
| Pulverized sulfur | | 60 | | |
| Kieselguhr | 97.25 | 35 | 95 | 97.2 |

The toxicity of the insecticides in accordance with this invention is illustrated by Table 3 which gives results of Peet-Grady tests upon fly sprays in which kerosene is the diluent.

Table 3

| Terpene thiocyanoacylate | Concentration in deodorized kerosene | Toxicity to house flies as measured by Peet-Grady test | |
|---|---|---|---|
| | | Knocked down | Dead in 24 hours |
| | Percent | Percent | Percent |
| Bornyl thiocyano acetate | 2.5 | 88 | 32 |
| Do | 5.0 | 97 | 56 |
| Fenchyl thiocyano acetate | 2.5 | 97 | 63 |
| Do | 5.0 | 99.4 | 86 |
| Fenchyl alpha-thiocyano propionate | 2.5 | 98.0 | 69 |
| Do | 5.0 | 99.6 | 90 |
| Fenchyl beta-thiocyano propionate | 5.0 | 99.0 | 74 |

It will be understood that the details and examples given herein are by way of illustration and not by way of limitation of the invention as broadly described and claimed.

What I claim and desire to protect by Letters Patent is:

1. A parasiticide comprising a compound of the formula ROOCR'XCN in which R is a terpene radical, R' is a radical selected from the group consisting of aliphatic and aromatic radicals, X is an element selected from the group consisting of sulfur, selenium and tellurium and the XCN group is a substituent of the R' radical, and a diluent.

2. A parasiticide comprising a compound of the formula ROOCR'SCN in which R is a terpene radical, R' is a radical selected from the group consisting of aliphatic and aromatic radicals and the SCN group is a substituent of the R' radical, and a diluent.

3. A parasiticide comprising a compound of the formula ROOCR'SCN in which R is a terpene radical, R' is an aliphatic radical and the SCN group is a substituent of the R' radical, and a diluent.

4. A parasiticide comprising a compound of the formula ROOCR'SCN in which R is a terpene radical, R' is an aliphatic radical and the SCN group is a substituent of the R' radical, and a volatile solvent.

5. A parasiticide comprising a compound of the formula ROOCR'SCN in which R is a terpene radical, R' is an aliphatic radical and the SCN group is a substituent of the R' radical, in disperse phase in water.

6. A parasiticide comprising a compound of the formula ROOCR'SCN in which R is a terpene radical, R' is an aliphatic radical and the SCN group is a substituent of the R' radical, deposited on a finely divided solid diluent.

7. A parasiticide composition comprising fenchyl thiocyanoacetate and a diluent.

8. A parasiticide composition comprising fenchyl thiocyanopropionate and a diluent.

9. A parasiticide composition comprising bornyl thiocyanoacetate and a diluent.

JOSEPH N. BORGLIN.